(12) United States Patent
Li et al.

(10) Patent No.: US 8,606,255 B2
(45) Date of Patent: Dec. 10, 2013

(54) ASYNCHRONOUS COMMUNICATION OVER COMMON PUBLIC RADIO INTERFACE (CPRI)

(75) Inventors: Guozhu Li, Beijing (CN); Hui Xu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 327 days.

(21) Appl. No.: 12/812,789

(22) PCT Filed: Jan. 17, 2008

(86) PCT No.: PCT/CN2008/000118
§ 371 (c)(1),
(2), (4) Date: Jul. 14, 2010

(87) PCT Pub. No.: WO2009/089652
PCT Pub. Date: Jul. 23, 2009

(65) Prior Publication Data
US 2011/0117901 A1  May 19, 2011

(51) Int. Cl.
*H04W 92/00* (2009.01)
(52) U.S. Cl.
USPC .......................................... 455/418; 455/561
(58) Field of Classification Search
USPC ................... 455/418, 461, 550.1; 370/342
See application file for complete search history.

(56) References Cited

U.S. PATENT DOCUMENTS

| | | | |
|---|---|---|---|
| 2004/0192373 A1* | 9/2004 | Galetti | 455/550.1 |
| 2005/0105534 A1 | 5/2005 | Osterling | |
| 2005/0105552 A1 | 5/2005 | Osterling | |
| 2005/0107124 A1 | 5/2005 | Osterling | |
| 2007/0091896 A1 | 4/2007 | Liu | |
| 2007/0270185 A1* | 11/2007 | Yagawa | 455/561 |
| 2009/0092117 A1* | 4/2009 | Jiang et al. | 370/342 |
| 2011/0286540 A1 | 11/2011 | Jiang et al. | |

FOREIGN PATENT DOCUMENTS

| | | | |
|---|---|---|---|
| CN | 1859396 A | 11/2006 | |
| CN | 1883178 | 12/2006 | |
| CN | 1883215 | 12/2006 | |
| CN | 1883217 | 12/2006 | |
| CN | 1956564 | 5/2007 | |
| CN | 101076173 A | 11/2007 | |
| WO | PCT/IB05/03036 | * 4/2006 | H04Q 7/30 |

OTHER PUBLICATIONS

International Search Report for PCT/CN2008/000118, mailed Oct. 30, 2008.

* cited by examiner

*Primary Examiner* — Patrick Edouard
*Assistant Examiner* — Myron K Wyche
(74) *Attorney, Agent, or Firm* — Nixon & Vanderhye P.C.

(57) ABSTRACT

A distributed radio base station (20) comprises a first distributed portion; a second distributed portion; and a parallel communications link (26). An indicator of serial data transmission rate is included in a control word transmitted between the distributed portions of the distributed radio base station so that serial data output from the distributed radio base station can be transmitted at a same rate as input to the distributed radio base station.

7 Claims, 6 Drawing Sheets

INDEX OF CONTROL WORD WITHIN HYPERFRAME $X = N_s + 64 \cdot X_s$ (some indices X are inserted as examples)

- ■ COMMA BYTE
- ▨ SYNC & TIMING
- □ SLOW C&M LINK L1 INBAND PROTOCOL
- □ RESERVED
- □ VENDOR SPECIFIC
- ≡ FAST C&M LINK
- p POINTER TO START OF FAST C&M

<-Pointer P

ASYNCHRONOUS COMMUNICATION OVER COMMON PUBLIC RADIO INTERFACE (CPRI)

This application is the U.S. national phase of International Application No. PCT/CN2008/000,118, filed 17 Jan. 2008, the entire contents of which is hereby incorporated by reference.

TECHNICAL FIELD

This application is related to radio access networks involved in wireless telecommunications, and particularly relates to an internal parallel communications link (such as the Common Public Radio Interface (CPRI)) of a distributed radio base station which serves for linking a radio equipment portion of the radio base station to a radio equipment control portion of the distributed radio base station.

BACKGROUND

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a radio base station (e.g., BTS, RBS or NodeB). A cell is a geographical area where radio coverage is provided by the radio equipment at a base station site. Each cell is identified by a unique identity, which is broadcast in the cell. The radio base stations communicate over the air interface (e.g., radio frequencies) with the user equipment units (UE) within range of the base stations. In the radio access network, several base stations are typically connected (e.g., by landlines or microwave) to a control node known as a base station controller (BSC) or radio network controller (RNC). The control node supervises and coordinates various activities of the plural radio base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which, at least in some respects, builds upon the radio access technology known as Global System for Mobile communications (GSM) developed in Europe. UTRAN is essentially a radio access network providing wideband code division multiple access (WCDMA) to user equipment units (UEs).

In many radio access networks the radio base station is a concentrated node with essentially most of the components being located at concentrated site. However, a radio base station can also be configured with a more distributed architecture. For example, a distributed radio base station can take the form of one or more radio equipment (RE) portions that are linked to a radio equipment control (REC) portion over a radio base station internal interface.

One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface (CPRI) Interface Specification Version 3.0 (Oct. 20, 2006), which is incorporated by reference herein in its entirety.

Other documents describing developments relevant to Common Public Radio Interface (CPRI) include but are not limited to the following (all of which are incorporated herein by reference): U.S. Patent Publication US-2005-0105534-A1 entitled "Encapsulation of Diverse Protocols Over Internal Interface of Distributed Radio Base Station"; U.S. Patent Publication US-2005-0105552-A1 entitled "Encapsulation of Independent Transmissions Over Internal Interface of Distributed Radio Base Station"; and (3) U.S. Patent Publication US-2005-0107124-A1 entitled "Pre-Start-Up Procedure For Internal Interface of Distributed Radio Base Station".

In a distributed radio base station node comprising radio equipment control (REC) portion and a radio equipment (RE) portion, information transfer between the radio equipment control (REC) portion and the radio equipment (RE) portion occurs by use of a parallel control word transmitted over the radio base station internal interface (e.g., over the CPRI interface). Data communication by the radio equipment control (REC) with a network side of the radio base station and beyond, as well as data communication by the radio equipment (RE) portion with the transceiver side of the radio base station and beyond, occurs by serial communication. Thus, serial links are connected to both the radio equipment control (REC) portion and the radio equipment (RE) portion of the distributed radio base station. There has been imposed a requirement to use asynchronous serial communication, such as RS485 or RS232, over these serial links, and thus for information exchange between the radio equipment control (REC) portion and the radio equipment (RE) portion.

What is need therefore, are method, apparatus, and techniques for facilitating use of variable baud rates by a distributed radio base station.

BRIEF SUMMARY

In one of its aspects the technology concerns a distributed radio base station comprising a first distributed portion (such as a radio equipment controller (REC) portion); a second distributed portion (such as a radio equipment (RE) portion); and a parallel communications link connected between the two distributed portions of the radio base station. A first transfer function is situated at one of the distributed portions, the first transfer function being connected to a first serial link. A first internal interface is connected between the first transfer function and the parallel communications link. Similarly, a second transfer function is situated at the other of the distributed portions of the radio base station, the second transfer function being connected to a second serial link. A second internal interface is connected between the second transfer function and the parallel communications link. The first internal interface is configured to insert, in a control word transmitted on the parallel communications link, an indicator of data transmission rate of data received by the first transfer function. The second internal interface is configured to obtain the indicator of data transmission rate from the control word and to set a data transmission rate of the second transfer function for transmission of data on the second serial link in accordance with the indicator.

According to an example embodiment, preferably the parallel communications link is operated as a Common Public Radio Interface (CPRI), and the first transfer function and the second transfer function both comprise universal asynchronous receiver transmitters.

In an example embodiment, the indicator comprises a multi-bit portion of the control word. Different combinations of bit values for the multi-bit portion of the control word correspond to different serial baud rate values. Thus, in an example embodiment, the indicator carried by the control word specifies a serial data baud rate.

In an example embodiment, the first transfer function is a first modem configured to perform a serial to parallel transfer of data received by the first transfer function on the first serial link and the second transfer function is a second modem configured to perform a parallel to serial transfer for application to the second serial link. In an example implementation, the first modem and the second modem comprise universal asynchronous receiver transmitters (UARTs).

In another of its aspects the technology concerns a method of operating a distributed radio base station. The distributed radio base station comprises a parallel communications link connecting a first distributed portion of the radio base station (e.g., a radio equipment control (REC) portion) and a second distributed portion of the radio base station (e.g., a radio equipment control (REC) portion). The method comprises receiving, at a first transfer function connected to a first serial link, data transmitted at an actual data transmission rate over the first serial link. The first transfer function comprises one of the distributed portions of the radio base station. The actual data transmission rate is one of plural possible data transmission rates compatible with the first transfer function. The method further comprises including the data received at the first transfer function in a control word transmitted on the parallel communications link, and also inserting in the control word an indicator of the actual data transmission rate of data received by the first transfer function. The method further comprises, upon receiving the control word at another of the distributed portions of the radio base station, setting a data transmission rate of a second transfer function for transmission of data on a second serial link in accordance with the indicator.

In an example embodiment, the method further comprises inserting the indicator in a multi-bit portion of the control word, and using the indicator to specify an actual serial data baud rate. The actual serial data baud rate is one of plural possible actual serial data baud rates.

In an example embodiment, the method further comprises using the first transfer function to convert the data from serial format to parallel format (e.g., for insertion in the control word), and using the second transfer function to convert the data from parallel format to serial format upon receiving the control word from the parallel communications link.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating principles.

DETAILED DESCRIPTION

In the following description, for purposes of explanation and not limitation, specific details are set forth such as particular architectures, interfaces, techniques, etc. in order to provide a thorough understanding. However, it will be apparent to those skilled in the art that the described technology may be practiced in other embodiments that depart from these specific details. That is, those skilled in the art will be able to devise various arrangements which, although not explicitly described or shown herein, are included within the spirit and scope of the claims. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

Figure 1:
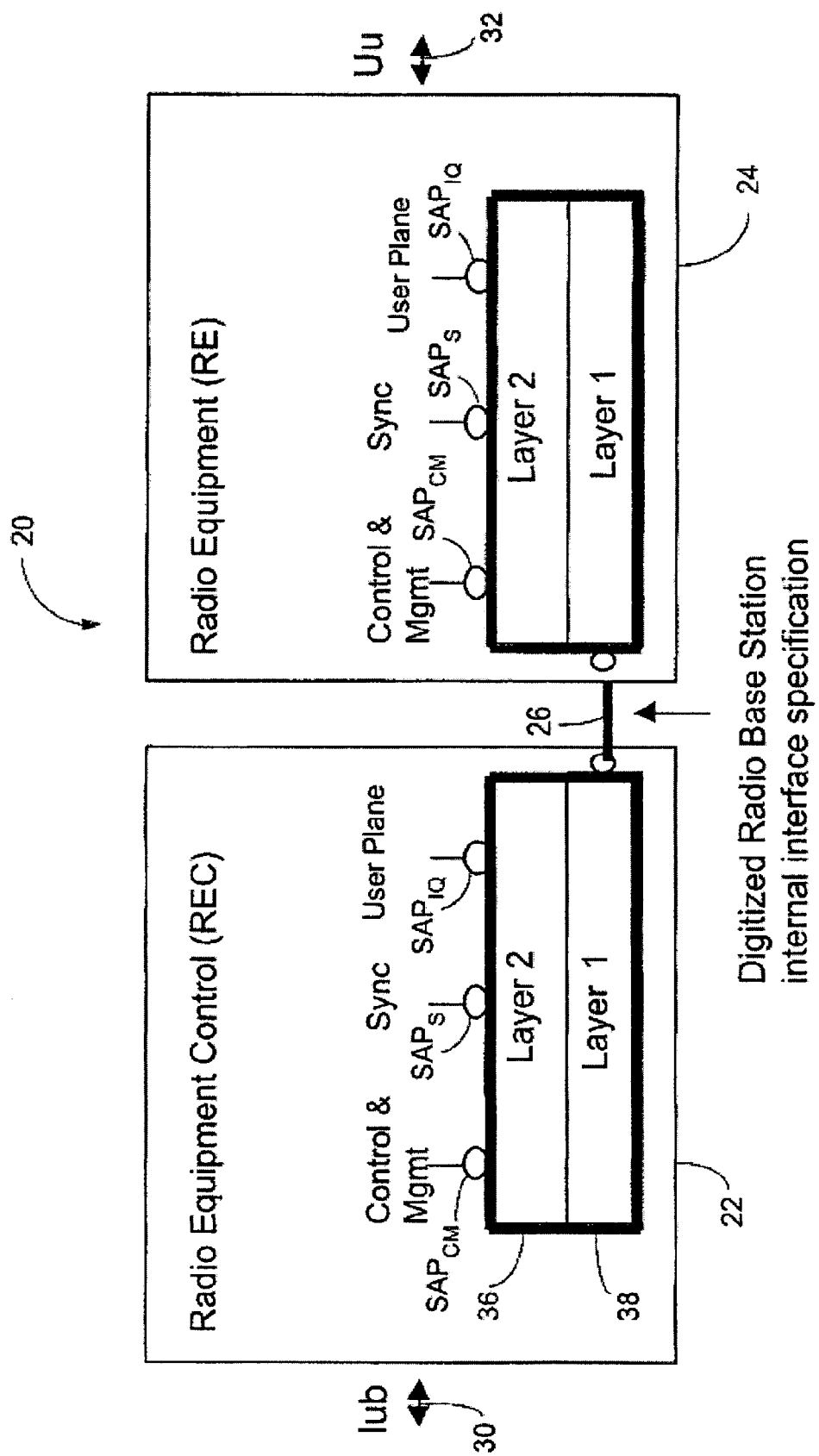
FIG. 1 is a schematic view of an example embodiment of a distributed radio base station.

FIG. 1 shows an example embodiment of a distributed radio base station 20. The radio base station 20 comprises both a radio equipment controller (REC) 22 and a radio equipment (RE) 24. The radio equipment controller (REC) 22 and radio equipment (RE) 24 are connected by parallel communications link 26. In the example implementation herein described, parallel communications link 26 is a CPRI link. Details of structure and operation of radio base station 20 and parallel communications link 26 (which takes the form of a CPRI link) are understood from the Common Public Radio Interface (CPRI) Interface Specification Version 3.0 (Oct. 20, 2006), which is incorporated by reference herein in its entirety. As in the specification, the description herein is based on the UMTS (Universal Mobile Telecommunication System) nomenclature. However, the radio base station 20 and the parallel communications link 26 may operate in accordance with other radio standards.

The radio equipment controller (REC) 22 and radio equipment (RE) 24 may be physically separated (i.e., the radio equipment (RE) 24 may be close to the antenna, whereas the radio equipment controller (REC) 22 may be located in a conveniently accessible site). Alternatively, both radio equipment controller (REC) 22 and radio equipment (RE) 24 may be co-located as in a conventional radio base station design.

As illustrated in FIG. 1, radio equipment controller (REC) 22 provides an access towards an unillustrated Radio Network Controller via the Iub interface 30 (for the UMTS radio access network). Basically, the radio equipment controller (REC) 22 is concerned with the Iub transport and Iub protocols, the Node B (base station) control and management, as well as the digital baseband processing. For the downlink (i.e., from radio equipment controller (REC) 22 to radio equipment (RE) 24), the radio equipment controller (REC) 22 handles such operations as channel coding, interleaving, spreading, scrambling, adding of physical channels, controlling transmit power of each physical channel, frame and slot signal generation (including clock stabilization). For the uplink (i.e., from radio equipment (RE) 24 to radio equipment controller (REC) 22), the radio equipment controller (REC) 22 handles such operations as channel de-coding, de-interleaving, de-spreading, de-scrambling, signal distribution to signal processing units, detection of feedback information for transmit power control, and signal to interference ratio measurement.

The radio equipment (RE) 24 serves the air interface 32 to the user equipment (in an UMTS network the air interface is called the Uu interface). The user equipment unit, or mobile station, is not illustrated in FIG. 1. The radio equipment (RE) 24 provides the analogue and radio frequency functions such as filtering, modulation, frequency conversion and amplification. For the downlink, the radio equipment (RE) 24 performs operations such as digital to analogue conversion, up conversion, on/off control of each carrier, carrier multiplexing, power amplification and limiting, antenna supervision, and RF filtering. For the uplink, the radio equipment (RE) 24 performs operations such as analogue to digital conversion, down conversion, automatic gain control, carrier de-multiplexing, low noise amplification, and RF filtering.

Thus, the radio equipment controller (REC) 22 comprises the radio functions of the digital baseband domain, whereas the radio equipment (RE) 24 contains the analogue radio frequency functions. The functional split between both parts is done in such a way that a generic interface based on In-Phase and Quadrature (IQ) data can be defined.

The Common Public Radio Interface (CPRI) Interface Specification Version 3.0 (Oct. 20, 2006) defines protocols for the physical layer 34 (layer 1) and the data link layer 36 (layer 2). Layer 1 defines, e.g., electrical characteristics, optical characteristics, time division multiplexing of the different data flows, and low level signaling. Layer 2 defines the media access control, flow control and data protection of the control and management information flow.

Figure 2A:
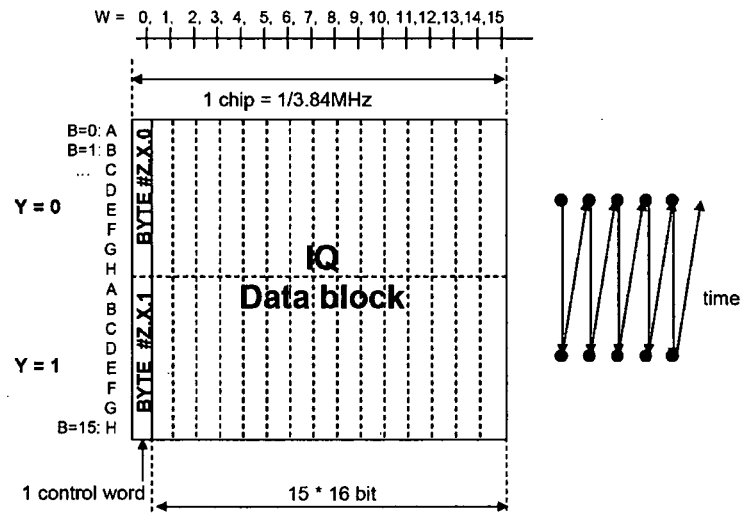
FIG. 2A is a diagrammatic view of basic frame structure for one example data rate for use over an internal interface for a distributed base station.

Information flow over the parallel communications link 26 of radio base station 20 is carried in frames. In the example implementation which is compatible with Common Public Radio Interface Specification Version 3.0 (Oct. 20, 2006), the length of a basic frame is 1 Tchip=1/3.84 MHz=260.416667 ns. As shown in FIG. 2A, for such compatible implementation a basic frame consists of 16 words with index W=0 . . . 15. The word with the index W=0, 1/16 of the basic frame, is used for one control word. The length T of the word depends on the total data rate. The Common Public Radio Interface (CPRI) Interface Specification Version 3.0 (Oct. 20, 2006) define three alternative data rates, each with differing word lengths: 614.4 Mbit/s (length of word T=8); 1228.8 Mbit/s (length of word T=16); and 2457.6 Mbit/s (length of word T=32). FIG. 3A illustrates the frame structure for the 614.4 Mbit/s total data rate.

Figure 2B:
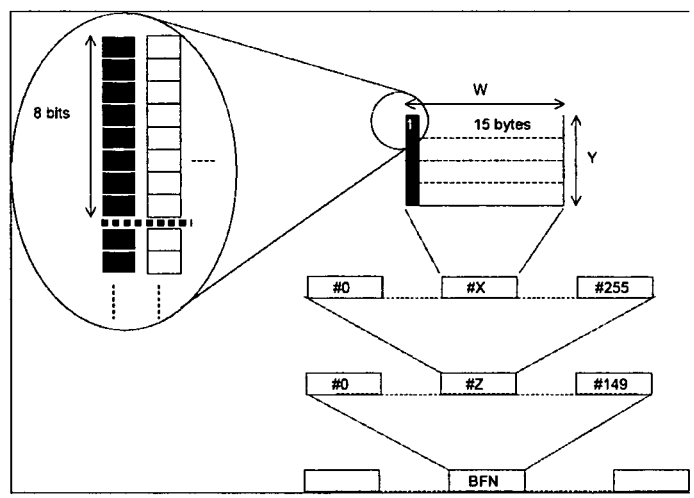
FIG. 2B is a diagrammatic view of a hyperframe structure for one example implementation.

The Common Public Radio Interface (CPRI) Interface Specification Version 3.0 (Oct. 20, 2006) and Version 1.1 (May 10, 2004) also define a hyperframe structure which is hierarchically embedded between the basic frame and the UMTS radio frame as shown in FIG. 2B. In FIG. 2A and/or FIG. 2B, Z is the hyperframe number; X is the basic frame number within a hyperframe; W is the word number within a basic frame; and Y is the byte number within a word. Each hyperframe comprises 256 basic frames and thus equates to 66.67 μs. A UMTS radio frame (BFN) comprises 150 hyperframes, e.g., 10 ms.

In FIG. 2A and FIG. 2B, the control word is defined as word with rank W=0. Each bit within a word can be addressed with the index B, where B=0 is the LSB of the BYTE Y=0, B=8 is the LSB of BYTE Y=1, B=16 is the LSB of BYTE Y=2, and B=24 is the LSB of BYTE Y=3.

Figure 3:
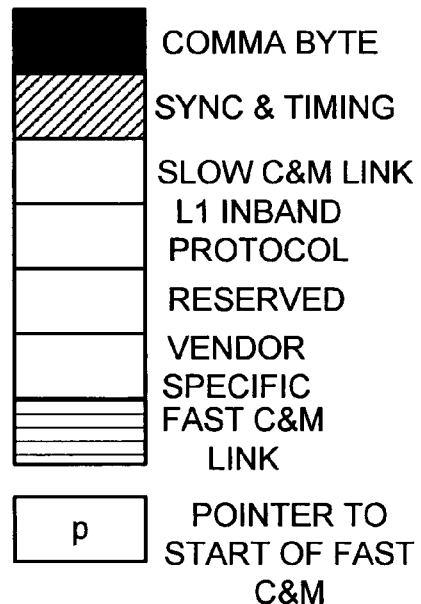
FIG. 3 is a diagrammatic view showing organization of control words in subchannels of a hyperframe.

The 256 control words of a hyperframe are organized into sixty four subchannels of four control words each. The organization of the control words in subchannels is illustrated in FIG. 3. One subchannel contains four control words per hyperframe. The index Ns of the subchannel ranges from zero to sixty three. The index Xs of a control words within a subchannel has four possible values, namely 0, 1, 2 and 3. The index X of the control word within a hyperframe is given by X=Ns+64*Xs.

Figure 4:
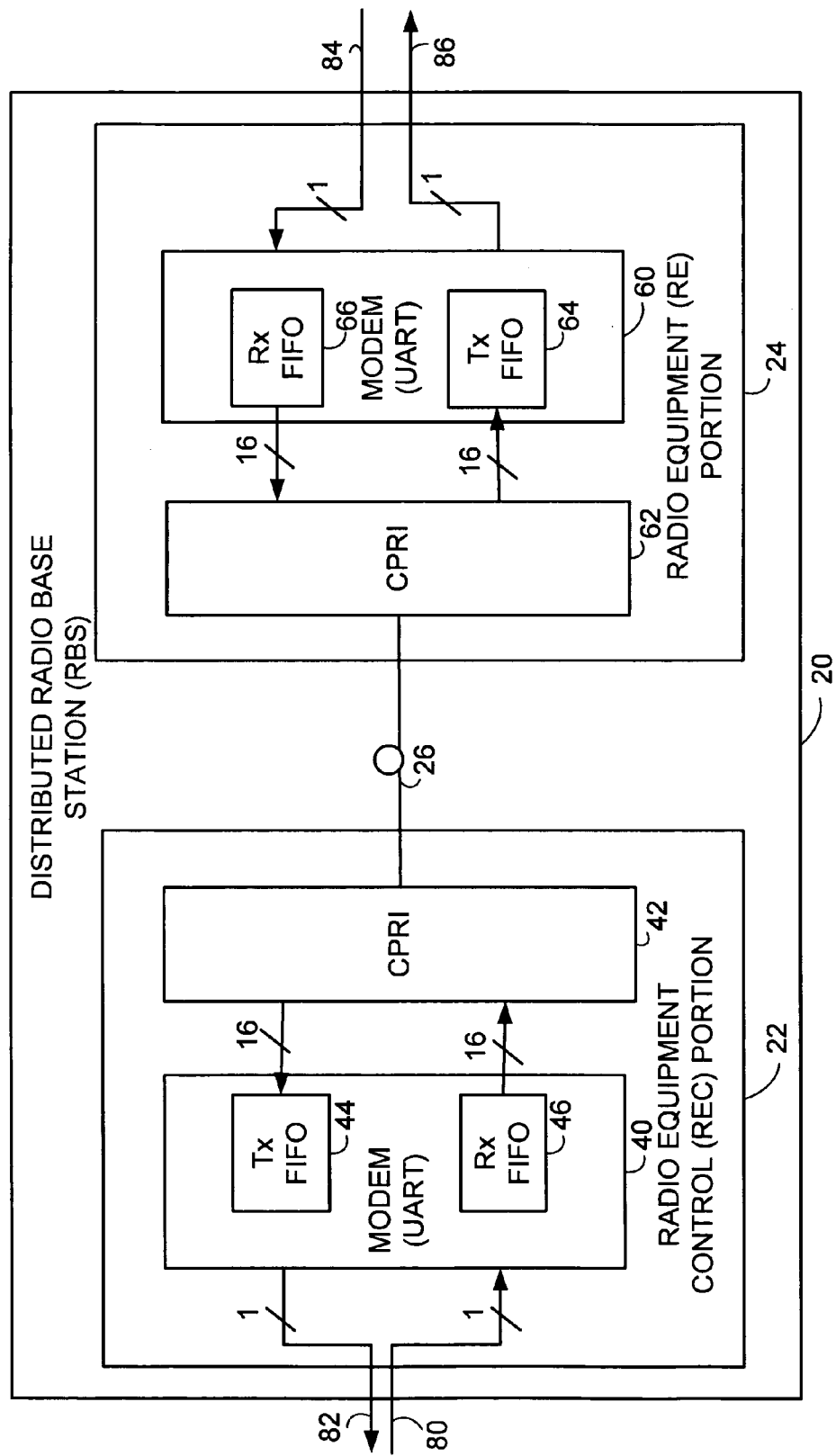
FIG. 4 is a diagrammatic view showing in more detail example constituent elements of the distributed radio base station of FIG. 1.

FIG. 4 shows a distributed radio base station such as distributed radio base station 20 of FIG. 1 in a manner that further illustrates an example embodiment of selected constituent components of radio equipment controller (REC) 22 and radio equipment (RE) 24 as connected by parallel communications link 26. It will be appreciated that, for simplicity, other functions not illustrated in FIG. 4 (such as the radio functions of the digital baseband domain of radio equipment controller (REC) 22 and the analogue radio frequency functions of radio equipment (RE) 24) are not illustrated herein.

In the example distributed radio base station 20 of FIG. 4, radio equipment controller (REC) 22 comprises a transfer function such as modem 40 and CPRI interface 42. The modem 40 comprises two first in-first out (FIFO) registers: transmit (Tx) FIFO 44 and receive (Rx) FIFO 46. In essentially symmetrical manner, radio equipment (RE) 24 comprises a second transfer function such as modem 60 and CPRI interface 62, with modem 60 comprising Tx FIFO 64 and Rx FIFO 66. Both (Tx) FIFO 44 and receive (Rx) FIFO 46 are used at the "CPRI" side of modem 40; both Tx FIFO 64 and Rx FIFO 66 are used at the "CPRI" side of modem 60. The FIFO registers serve, e.g., to "pool" data, since one control word rate in CPRI is 15 KHz and one sub-channel rate is 60 KHz, while the serial data rate typical value is, for example, 9.6 kbps, 115.2 kpbs, etc.

As indicated above, in an example embodiment the first transfer function is a first modem such as modem 40 and the second transfer function is a second modem such as modem 60. The first modem 40 is configured to perform a serial to parallel transfer of data received by the first transfer function on the first serial link. The second modem 60 is configured to perform a parallel to serial transfer for application to the second serial link. In an example implementation, modem 40 and modem 60 can be realized as UARTs (Universal Asynchronous Receiver Transmitters).

The modem 40 of radio equipment controller (REC) 22 is connected to receive data from an Iub side of the distributed radio base station on an input serial line 80; modem 40 is connected to apply data on output serial line 82 to the Iub side of the distributed radio base station. In essentially mirror image fashion, modem 60 of radio equipment (RE) 24 is connected to receive data from an Uu side of the distributed radio base station on an input serial line 84; modem 60 is connected to apply data on output serial line 86 to the Uu side of the distributed radio base station. The connections comprising input serial line 80 and output serial line 82 (connected to modem 40 of radio equipment controller (REC) 22), and the connections comprising input serial line 84 and output serial line 86 (connected to modem 60 of radio equipment (RE) 24), can be realized by any appropriate serial interface connection, such as RS232, RS485, RS449, RS422, or RS423, for example.

When referring to a flow of data from Iub interface 30 toward air interface 32, radio equipment controller (REC) 22 is considered a first distributed portion of the distributed radio base station, being connected to a first serial link (e.g., input serial line 80) and comprising a first transfer function (e.g., modem 40) and a first internal interface (e.g., CPRI interface 42, which is connected between the first modem 40 and the parallel communications link 26). In the sense of data flow from Iub interface 30 toward air interface 32, radio equipment (RE) 24 is considered a second distributed portion of the distributed radio base station, being connected to a second serial link (e.g., output serial line 86) and comprising a second transfer function (e.g., modem 60) and a second internal interface (e.g., CPRI interface 62, which is connected between the second modem 60 and the parallel communications link 26).

On the other hand, when referring to a flow of data from air interface 32 toward Iub interface 30, radio equipment (RE) 24 is considered a first distributed portion of the distributed radio base station, being connected to a first serial link (e.g., input serial line 84) and comprising a first transfer function (e.g., modem 60) and a first internal interface (e.g., CPRI interface 62, which is connected between the first modem 60 and the parallel communications link 26). In the sense of data flow from air interface 32 toward Iub interface 30, radio equipment controller (REC) 22 is considered a second distributed portion of the distributed radio base station, being connected to a second serial link (e.g., output serial line 82) and comprising a second transfer function (e.g., modem 40) and a second internal interface (e.g., CPRI interface 42, which is connected between the second modem 40 and the parallel communications link 26).

The modem 40 and modem 60 essentially receive asynchronous serial data on their respective input serial line 80 and input serial line 84, in accordance with the transmission rate then current on the respective link. The asynchronous serial data received on the respective input serial line usually comprise one start bit, followed by eight data bits, followed by one stop bit. Each of modem 40 and modem 60 comprises both a transmitter part and a receiver part, the transmitter part and the receiver part working fully in duplex. The receiver part of each of modem 40 and modem 60 performs a S/P (serial to parallel) conversion of the incoming asynchronous serial data, loads the incoming data (now in parallel form) into its respective Rx FIFO (e.g., Rx FIFO 46 or Rx FIFO 66), and then provides (over a sixteen bit-wide bus) the parallel data to the respective first CPRI interface (e.g., to CPRI interface 42 or CPRI interface 62). The respective CPRI interface includes the parallel data in a control word for application over parallel communications link 26. The control word, and particularly insertion of a transmission rate indicator in the control word, is discussed further herein.

The receiving CPRI interface of the second distributed portion of the radio base station receives the control word and transmits the control word (over a sixteen bit-wide bus) in parallel format to the transmitter side of its modem, and particularly to the Tx FIFO. As explained herein, the transmission rate of the modem of the second distributed portion of the radio base station is set (e.g., adjusted), in accordance with the transmission rate indication carried in the control word, to match the transmission rate of the asynchronous data signal which is incoming to the distributed radio base station. The transmitting side of the modem of the second distributed portion of the radio base station then performs a P/S (parallel to serial) conversion of the digital data signal and applies the serial data signal on a second serial link, e.g., the output serial line of the second distributed portion of the radio base station.

The basic operation, as summarized above, can operate either in a first direction wherein data flows from Iub interface 30 toward air interface 32 (in which case the radio equipment controller (REC) 22 is the first distributed portion of the radio base station), or in a second or reverse direction wherein data flows from air interface 32 toward Iub interface 30 (in which case the radio equipment (RE) 24 is the first distributed portion of the radio base station).

Figure 5:
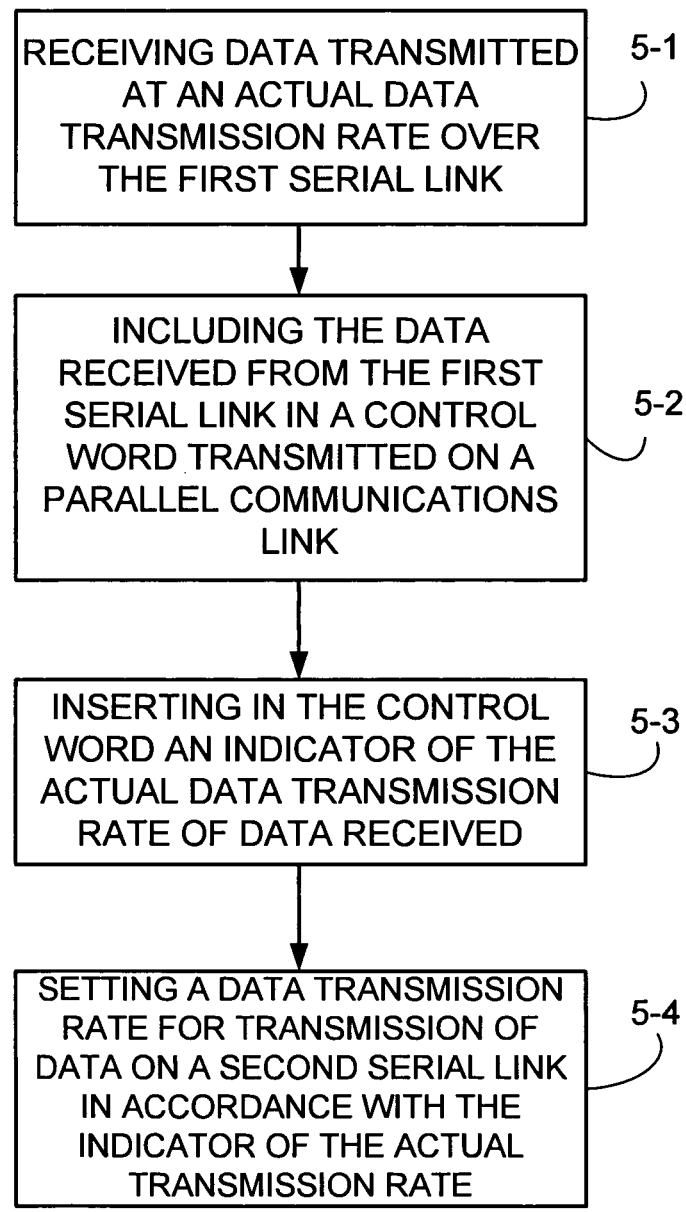
FIG. 5 is a flowchart for illustrating basic, representative, example acts or steps comprising an example method of operating an example distributed radio base station.

FIG. 5 illustrates basic, representative, example acts or steps involved in an example method of operating a distributed radio base station such as the distributed radio base station of FIG. 4. Act 5-1 of the example method comprises receiving, at a first modem connected to a first serial link, data transmitted at an actual data transmission rate over the first serial link. The actual data transmission rate is one of plural possible data transmission rates compatible with the first serial link and the first modem.

The first modem comprises one of the distributed portions of the radio base station. As mentioned above, whether modem 40 or modem 60 is considered the "first modem" depends on the direction of data flow. For sake of discussion, the method of FIG. 5 will now be described with respect to data flow in a direction from Iub interface 30 to air interface 32, so that (for sake of an example for present discussion), the radio equipment controller (REC) 22 is considered the "first" distributed portion of the distributed radio base station and radio equipment (RE) 24 is considered the "second" distributed portion of the distributed radio base station. Consequently, modem 40 is considered (for sake of an example for present discussion) the "first" modem and input serial line 80 is considered the "first" serial link, and modem 60 is considered the "second" modem and 86 is considered the "second" serial link.

Act 5-2 comprises including the data received at the first modem (on the first serial link) in a control word transmitted on the parallel communications link, e.g., on parallel communications link 26. In an example implementation, possible subacts comprising act 5-2 include subacts 5-2-1 through 5-2-4 such as those illustrated in FIG. 5A. Subact 5-2-1 comprises performing a S/P(serial to parallel) conversion of the incoming asynchronous serial data. Subact 5-2-2 comprises loading the incoming data (now in parallel form) into its respective Rx FIFO (e.g., Rx FIFO 46). Subact 5-2-3 comprises providing (over a sixteen bit-wide bus) the parallel data to the respective first CPRI interface (e.g., to CPRI interface 42). Subact 5-2-4 comprises the first CPRI interface including the parallel data in the control word for application over parallel communications link 26.

In an example which supports maximum 460.8 kbps serial data, four words of one subchannel are used to carry the parallel data, the available word rate of the example being 60 KHz. An example bit definition of an example control word capable of utilization as the control word of act 5-2 is shown in Table 1. It should be understood that, in other embodiments and/or implementations, differing numbers of bits can comprise a control word and be utilized for the transmission rate indicator described herein.

TABLE 1

BIT DEFINITION OF CONTROL WORD

| Bit | Comments |
|---|---|
| 15 | '1'—This word contains data; '0'—This word contains NO data |
| 14-13 | Indicates the serial data baud rate |
| 11-8 | Reserved |
| 7-0 | Parallel data |

When the RX FIFO data is sent to CPRI interface (e.g., when the data is sent from Rx FIFO 46 to CPRI interface 42), the received data is organized according to Table 1. If the Rx FIFO is not empty, bit 15 of the control word is set to '1' and the eight bits of data are read out of the Rx FIFO and such data is respectively put in bit 7~0 of the control word. On the other hand, if the Rx FIFO is empty, bit 15 of the control bit is set to '0'.

Act 5-3 of the method of FIG. 5 comprises inserting in the control word an indicator of the actual data transmission rate of data received on the first serial link by the first modem (e.g., on input serial line 80 by modem 40). In an example implementation, act 5-3 comprises inserting the indicator in a multi-bit portion of the control word, and using the indicator to specify an actual serial data baud rate. The actual serial data baud rate is one of plural possible actual serial data baud rates. For example, a set of plural possible actual serial data baud rates can include 9.6, 115.2, 230.4, and 460.8 kbps. While only one of these rates would, at any time, be the actual transmission rate, from time to time the actual transmission rate can change. Advantageously, as explained in ensuing actions, such change can be known by both portions of the distributed radio base station, e.g., communicated to the second distributed portion of the radio base station.

As an aside, "baud" is the unit of symbol rate, the number of distinct symbol changes (signalling events) made to the transmission medium per second in a digitally modulated signal. The symbol rate (expressed in baud) is distinct from the bit rate (expressed in bit/s). One symbol can carry more than one bit of information.

Thus, in act 5-3, an indicator of the actual transmission rate (e.g., serial baud rate) is also transmitted to the second distributed portion of the distributed radio base station in the control word. In the example control word format of Table 1, an indicator of the actual transmission rate (e.g., serial baud rate) is transmitted in bits 13 and 14 of the control word. As mentioned above, in an example implementation, the indicator comprises a multi-bit portion of the control word (e.g., bits 13 and 14 of the control word of Table 1). Different combinations of bit values for the multi-bit portion of the control word correspond to different serial baud rate values. Thus, for example, a bit pattern of "00' in bits 13 and 14 of the control word might indicate an actual transmission serial baud rate of 9.6 kbps; a bit pattern of "01' in bits 13 and 14 of the control word might indicate an actual transmission serial baud rate of 115.2 kbps; a bit pattern of "11" in bits 13 and 14 of the control word might indicate an actual transmission serial baud rate of 230.4 kbps; and a bit pattern of "10' in bits 13 and 14 of the control word might indicate an actual transmission serial baud rate of 460.8 kbps.

Variations and modifications to the control word of Table 1 encompass changing (e.g., increasing) the number of bits utilized for the indicator of actual transmission rate. For example, if more than four baud rates are possible and supported, a number of bits of the control word greater than two can be utilized.

Act 5-4 of FIG. 5, upon receiving the control word at the second distributed portions of the radio base station (e.g., at radio equipment (RE) 24 in the presently discussed example), setting a data transmission rate of the second modem (e.g., for modem 60) for transmission of data on the second serial link (e.g., on output serial line 86) in accordance with the indicator.

Figures 5A, 5B:
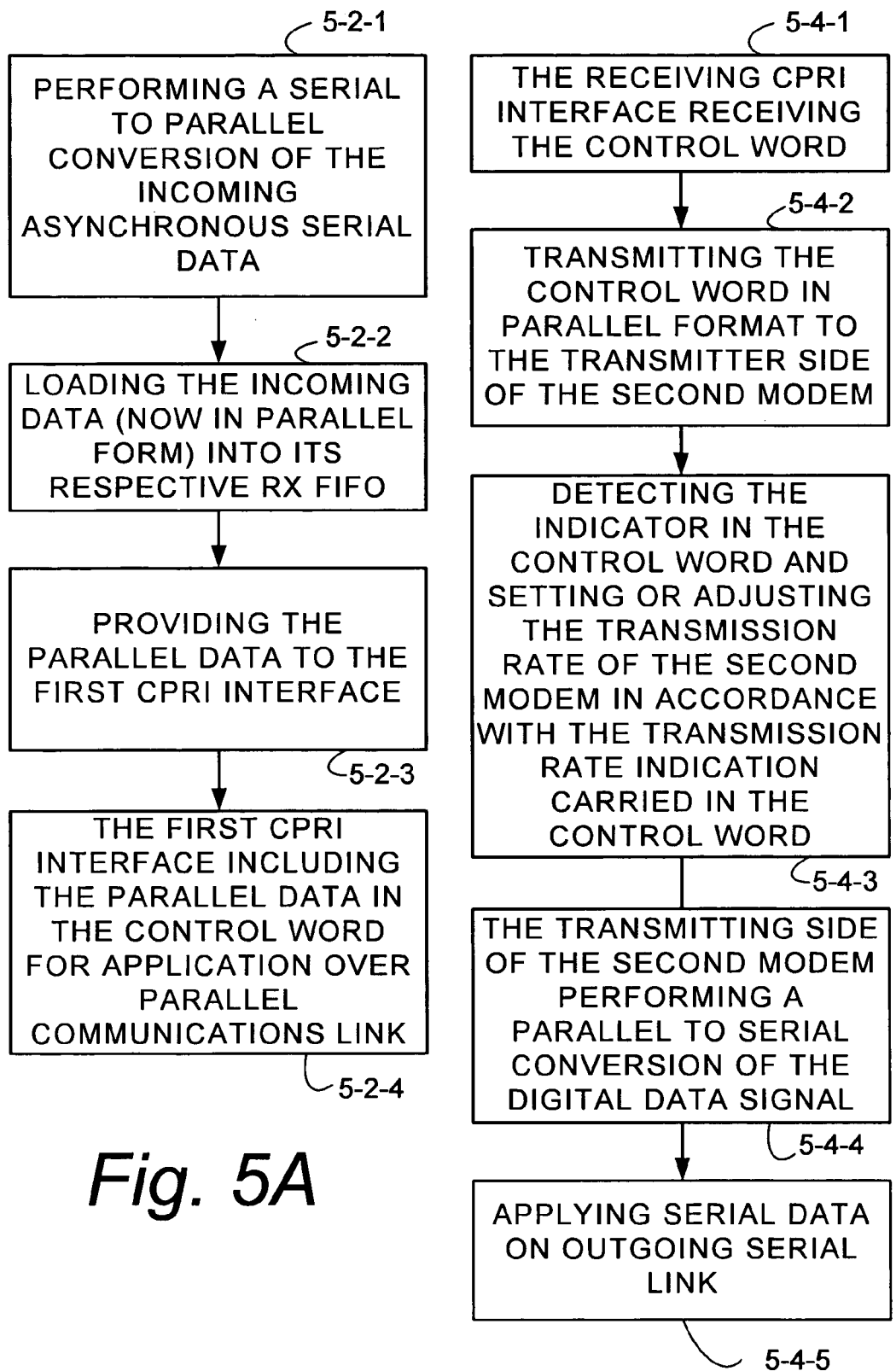
FIG. 5A is a flowchart for illustrating basic, representative, example subacts or substeps comprising a second example act or step of the example method of FIG. 5.
FIG. 5B is a flowchart for illustrating basic, representative, example subacts or substeps comprising an fourth example act or step of the example method of FIG. 5.

In an example implementation, possible subacts comprising act 5-4 include subacts 5-4-1 through 5-4-5 such as those illustrated in FIG. 5B. Subact 5-4-1 comprises the receiving CPRI interface (e.g., CPRI interface 62) of the second distributed portion of the radio base station (e.g., radio equipment (RE) 24) receiving the control word. Subact 5-4-2 comprises transmitting the control word (over a sixteen bit-wide bus) in parallel format to the transmitter side of its modem (e.g., modem 60) [and particularly transmitting contents of the control word to the Tx FIFO (e.g., Tx FIFO 64)]. Subact 5-4-3 comprises detecting the indicator in the control word and setting or adjusting the transmission rate of the second modem (e.g., modem 60) in accordance with the transmission rate indication carried in the control word. Subact 5-4-4 comprises the transmitting side of the modem (e.g., modem 60) performing a P/S (parallel to serial) conversion of the digital data signal. Subact 5-4-5 comprises applying the serial data signal on a second serial link, e.g., output serial line 86, which now is transmitted at the actual transmission rate of the first serial line (e.g., input serial line 80) in view of the transmission rate coordination of modem 40 and modem 60 accomplished by including the indicator of actual transmission rate in the control word.

In applying the serial data signal on a second serial link, e.g., output serial line 86, in accordance with subact 5-4-5, bit 15 of the control word is detected. When bit 15 of the control word has a value of '1', the eight least significant bits (LSBs) of the control word is written to the Tx FIFO (e.g., Tx FIFO 64). When the Tx FIFO is not empty, the data will be read out by transmit logic of the modem 60, with a start bit being sent out first, followed by the eight data bits from the control word sent out serially, followed finally by a stop bit.

Thus, the setting or adjusting of the transmission rate of the second modem (e.g., modem 60) of act 5-4 in accordance with the transmission rate indication carried in the control word is to match the transmission rate of the asynchronous data signal which is incoming to the distributed radio base station.

As indicated above, while only one of plural possible serial data transmission rates is utilized at any one time as the actual transmission rate, from time to time the actual transmission rate can change. Using the indicator of actual transmission rate as included in the control word in an example way as herein described such change of actual transmission rate can be known by both portions of the distributed radio base station, e.g., communicated to the second distributed portion of the radio base station.

The first distributed portion of the radio base station knows the actual transmission rate for the incoming serial data signal. Such knowledge of the actual transmission rate of the incoming serial data can be acquired in several ways. As a first way, the actual transmission rate can be manually input or "set" by the user of the input link using input pins of the first transfer function (e.g., modem 40), e.g., using two pins each of which can be set to a "1" or "0" value and thus used to express plural differing, distinct rates. As a second way, the first transfer function (e.g., modem 40) of the radio equipment control (REC) unit can receive an indication of the actual transmission rate over another interface (e.g., an interface other than the incoming serial link). As a third way, the first transfer function can be of a type which, in addition to receiving the serial data, has a capability for detecting the baud rate of the serial data on the incoming link, and which thereby provides an automatic baud rate detection.

This technology described herein thus provides a solution to transmission of asynchronous data such as asynchronous RS232 or RS485 data (or others) over CPRI. Moreover, variable baud rates are supported, such as (by way of non-limiting example) 9.6, 115.2, 230.4, and 460.8 kbps.

In example embodiments, UARTs (Universal Asynchronous Receiver Transmitters) are implemented in both the radio equipment control (REC) portion and the radio equipment (RE) portion of the distributed radio base station, to perform S/P(serial to parallel) and P/S(parallel to serial) transformations.

When data is sent from the radio equipment control (REC) portion to the radio equipment (RE) portion, the UART in radio equipment control (REC) portion receives the serial data; performs serial to parallel transformation; and then provides the parallel data to the CPRI interface. On the radio equipment (RE) portion, the UART obtains the parallel data from the CPRI interface; performs the parallel to serial transformation; and then sends the serial data out. The foregoing also operates in the reverse direction, e.g., from radio equipment (RE) portion to radio equipment control (REC) portion.

Thus, baud rate information is sent from the radio equipment control (REC) portion to the radio equipment (RE) portion (or vise versa) over the CPRI interface. UARTs in both the radio equipment control (REC) portion and the radio equipment (RE) portion are configured according to the baud rate information to support desired baud rate.

The present technology advantageously supports multiple baud rates which can be utilized interchangeably on the fly over the distributed radio base station.

Although the description above contains many specificities, these should not be construed as limiting the scope of the claims but as merely providing illustrations of some of the presently preferred embodiments. Therefore, it will be appreciated that the scope of the claims fully encompasses other embodiments which may become obvious to those skilled in the art, and that the claims accordingly are not to be limited. Reference herein to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed hereby. Moreover, it is not necessary for a device or method to address each and every problem sought to be solved, for it to be encompassed by the claims. Furthermore, no element, component, or method step in the present disclosure is intended to be dedicated to the public.

What is claimed is:

1. A distributed radio base station comprising:
    a first distributed portion of the radio base station;
    a second distributed portion of the radio base station;
    a parallel communications link connected between the first distributed portion and the second distributed portion;
    a first universal asynchronous receiver transmitter situated at one of the distributed portions, the first universal asynchronous receiver transmitter being connected to a first asynchronous serial communications link;
    a first internal interface connected between the first universal asynchronous receiver transmitter and the parallel communications link;
    a second universal asynchronous receiver transmitter situated at another of the distributed portions, the second universal asynchronous receiver transmitter being connected to a second asynchronous serial communications link; and
    a second internal interface connected between the second universal asynchronous receiver transmitter and the parallel communications link;
    wherein the first universal asynchronous receiver transmitter is configured to insert, in a control word transmitted on the parallel communications link, an indicator of a serial data baud rate of data asynchronously received by the first universal asynchronous receiver transmitter, and
    wherein the second universal asynchronous receiver transmitter is configured to obtain the indicator of the serial data baud rate from the control word and to set a data transmission rate of the second universal asynchronous receiver transmitter for transmission of data on the second asynchronous serial link in accordance with the indicator,
    wherein the indicator comprises a multi-bit portion of the control word, and
    wherein different combinations of bit values for the multi-bit portion of the control word correspond to different serial baud rate values.

2. The apparatus of claim 1, wherein the first distributed portion of the radio base station is a radio equipment control (REC) portion and the second distributed portion of the radio base station is a radio equipment (RE) portion.

3. The apparatus of claim 1, wherein the parallel communications link is operated as a Common Public Radio Interface (CPRI).

4. The apparatus of claim 1, wherein the first universal asynchronous receiver transmitter is a first modem configured to perform a serial to parallel transfer of data received by the first universal asynchronous receiver transmitter on the first asynchronous serial link and the second universal asynchronous receiver transmitter is a second modem configured to perform a parallel to serial transfer for application to the second asynchronous serial link.

5. A method of operating a distributed radio base station comprising a parallel communications link connecting a first distributed portion and a second distributed portion, the method comprising:
    receiving, at a first universal asynchronous receiver transmitter connected to a first asynchronous serial link, data transmitted asynchronously at an actual data transmission rate over the first asynchronous serial link, the first universal asynchronous receiver transmitter comprising one of the distributed portions of the radio base station, the actual data transmission rate being one of plural possible data transmission rates compatible with the first universal asynchronous receiver transmitter;
    including the data received at the first universal asynchronous receiver transmitter in a control word transmitted on the parallel communications link;
    inserting in a multi-bit portion of the control word an indicator of an actual serial data baud rate of data received by the first universal asynchronous receiver transmitter, the actual serial data baud rate being one of plural possible actual serial data baud rates of data received by the first universal asynchronous receiver transmitter;

receiving the control word at another of the radio equipment control (REC) portion and the radio equipment (RE) portion; and setting a data transmission rate of a second universal asynchronous receiver transmitter for transmission of data on a second asynchronous serial link in accordance with the indicator, the second universal asynchronous receiver transmitter being situated at another of the distributed portions of the radio base station and connected to the second serial link.

6. The method of claim 5, further comprising using the first universal asynchronous receiver transmitter to convert the data from serial format to parallel format.

7. The method of claim 5, further comprising using the second universal asynchronous receiver transmitter to convert the data from parallel format to serial format upon receiving the control word from the parallel communications link.

* * * * *